United States Patent [19]

Harrison

[11] 4,414,185

[45] Nov. 8, 1983

[54] PROCESS FOR CALCIUM FLUORIDE PRODUCTION FROM INDUSTRIAL WASTE WATERS

[75] Inventor: Jonas P. Harrison, Pinole, Calif.

[73] Assignee: Chevron Research Company, San Francisco, Calif.

[21] Appl. No.: 406,420

[22] Filed: Aug. 9, 1982

[51] Int. Cl.$^3$ .............................................. C02B 1/20
[52] U.S. Cl. ..................................... 423/163; 423/490
[58] Field of Search ............... 423/430, 432, 490, 155, 423/163, 165

[56] References Cited

U.S. PATENT DOCUMENTS

| | | | |
|---|---|---|---|
| 3,443,890 | 5/1969 | Sisson et al. | 423/432 |
| 3,527,702 | 9/1970 | Holluta et al. | 423/165 |
| 3,627,480 | 12/1971 | Birchall | 423/431 |
| 4,226,710 | 10/1980 | Bruckenstein | 423/163 |

FOREIGN PATENT DOCUMENTS 51-11095  1/1976  Japan ................................ 423/490
235588  9/1926  United Kingdom ............... 423/490

OTHER PUBLICATIONS

Kirk–Othmer, *Encyclopedia of Chemical Technology,* Second Edition, vol. 4, Interscience Publishers, (1964), pp. 368, 369.

*Primary Examiner*—Edward J. Meros
*Assistant Examiner*—Wayne A. Langel
*Attorney, Agent, or Firm*—D. A. Newell; T. G. De Jonghe; C. J. Caroli

[57] ABSTRACT

A process for the preparation of calcium fluoride from industrial waste waters which comprises treatment of the waste waters with potassium hydroxide, followed by lime precipitation, neutralization with carbon dioxide and filtration to provide the calcium fluoride product.

7 Claims, No Drawings

PROCESS FOR CALCIUM FLUORIDE PRODUCTION FROM INDUSTRIAL WASTE WATERS

BACKGROUND OF THE INVENTION

This invention relates to a process for calcium fluoride production from industrial waste waters. More specifically, it relates to the production of calcium fluoride from industrial waste waters by lime precipitation and carbonation.

Significant concentrations of inorganic fluorides are found in industrial waste water from glass manufacturers, electroplating operations, steel producers and certain chemical plants. These concentrations may be excessive by environmental standards and must be removed prior to discharge of the effluent water into the environment. Lime softening or treating of water for fluoride removal is a well-known and established process for fluoride reduction. However, low purity calcium fluoride produced by such a process cannot be sold and is itself a disposal problem. Such processes use a considerable excess of lime and require acidification, often with hydrochloric acid, to lower the pH to about 7 to 9 in order that effluent water disposal will not be a hazard. In addition, hydrochloric acid neutralization results in products which cannot be easily separated due to gel formation.

U.S. Pat. No. 3,957,902 discloses a process for the recovery of hydrogen fluoride prior to disposal of waste HF alkylation process gases containing hydrogen fluoride. In this process, a hydrocarbon liquid selected to be essentially free of hydrogen fluoride contacts the waste gases, absorbs hydrogen fluoride and returns it to the process. This patent also describes as common in the art the treatment of waste gases with calcium hydroxide to precipitate calcium fluoride in the form of a sludge, which is then disposed of as waste. It is additionally noted therein that disposal of the resultant precipitate sludge poses an inconvenience to the processor.

U.S. Pat. No. 3,964,993 discloses a process for removing hydrogen fluoride from the sludge resulting from the HF treatment of hydrocarbons which comprises concurrently treating the sludge with aqueous caustic and a liquid aromatic hydrocarbon.

U.S. Pat. Nos. 4,145,282 and 4,226,710 describe a process for purifying waste water containing fluoride which comprises precipitating fluoride from the waste water as fluorapatite. In this process, fluoride is removed as fluorapatite by having sufficient available calcium for each mole of fluoride present in the waste water and sufficient available phosphate for each mole of fluoride in the waste water to form a precipitate which is or converts to sufficient fluorapatite to remove essentially all fluoride from the water.

Japanese Kokai (laid open) No. 78999/78 describes a process for treating waste hydrogen fluoride or a waste gas containing hydrogen fluoride. According to this process, the hydrogen fluoride is first neutralized with caustic potash and then treated with slaked lime to precipitate calcium fluoride. The calcium fluoride slurry thus obtained is neutralized with an aqueous mineral acid to a pH of 7 to 9. A high molecular weight flocculant is then added to the slurry to form a floc, which is subsequently dehydrated to give a calcium fluoride mass. One disadvantage of this process is the fact that the waste water filtrate contains highh halide levels. The major disadvantage of this process is the formation of a gelatinous precipitate of calcium fluoride which tends to clog vacuum filters, thus making recovery of calcium fluoride difficult.

SUMMARY OF THE INVENTION

It has now been found that high purity commercial grade calcium fluoride can be prepared from industrial waste waters containing fluoride by a process which comprises:

(a) contacting the industrial waste waters containing fluoride with aqueous potassium hydroxide to thereby obtain an aqueous solution of potassium fluoride and potassium hydroxide;

(b) contacting the solution of step (a) with finely divided high purity lime to thereby obtain a calcium fluoride precipitate in aqueous potassium hydroxide;

(c) settling the reaction product of step (b) into two phases comprising an aqueous potassium hydroxide supernatant and an aqueous slurry of calcium fluoride;

(d) recovering the aqueous potassium hydroxide supernatant;

(e) diluting the slurry of calcium fluoride with water;

(f) neutralizing the slurry of step (e) with carbon dioxide until the pH of the slurry is lowered to about 8 to 9; and (g) filtering the slurry of step (f) to thereby provide the calcium fluoride product.

Preferably, the aqueous potassium hydroxide recovered in step (d) of this process is recycled to step (a).

Among other factors, this invention is based on the discovery that a commercially pure calcium fluoride product can be obtained from aqueous solutions by precipitation using an essentially stoichiometric or slightly higher than stoichiometric amount of lime and neutralization with carbon dioxide. Advantageously, this process avoids neutralization with a mineral acid, such as hydrochloric acid. In addition, the lime utilized by the process of the present invention is a commercial or reagent grade finely divided high purity lime which reacts quickly to at least 85–90 percent conversion using a stoichiometric amount of lime. When the amount of lime utilized is about 20 percent above the stoichiometric equivalent, greater than 98 percent conversion can be obtained.

A further advantage of the present process is the finding that both the formation of gelatinous precipitates and the use of flocculants are completely avoided using gaseous carbon dioxide to reduce the pH to acceptable levels. The use of gaseous carbon dioxide for neutralization, rather than hydrochloric acid, also avoids product contamination by chlorides.

DETAILED DESCRIPTION OF THE INVENTION

One embodiment of the present invention relates to the treatment of industrial waste waters from various chemical and refining processes which involve treatment of hydrocarbons with HF (hydrogen fluoride). Typical HF-hydrocarbon processes include isomerization, polymerization and alkylation. Preferably, the waste waters are obtained as the result of a refinery HF alkylation process. In such processes, the waste waters contain a considerable quantity of HF.

According to a preferred embodiment of the invention, spent HF is separated from an alkylation plant as a distillation bottom HF tar product. This HF tar is thinned with a solvent and mixed with excess potassium hydroxide in a neutralizing vessel until all of the HF and about 80 percent of the potassium hydroxide is utilized. This aqueous solution contains about 15 to 20 weight percent potassium fluoride and 3 to 5 percent unreacted potassium hydroxide.

The basic potassium fluoride solution is then mixed with solid hydrated (slaked) lime in a stirred vessel where this calcium hydroxide [$Ca(OH)_2$] reacts to form the calcium fluoride precipitate and regenerate the potassium hydroxide. Since lime particle size and purity is important for both reactivity reasons and product purity, a commercial or reagent grade finely divided high purity lime is required. Generally, the lime purity should be greater than about 95 weight percent calcium hydroxide. The amount of lime used is generally from about 1 to about 1.3 times the stoichiometric requirement. Preferably, the amount of lime is from about 1.0 to about 1.2 times the stoichiometric requirement.

The resulting calcium fluoride slurry is settled and the clear supernatant containing the regenerated potassium hydroxide is separated for reuse.

The next step involves neutralization of the slurry. This step takes place in the same mixing vessel. The dewatered calcium fluoride slurry still contains unreacted caustic which must be removed prior to the subsequent filtration step. This is accomplished by reslurrying with water to about 10 weight percent solids concentration. The resulting slurry is then neutralized to a pH of about 8 to 9 by bubbling in carbon dioxide. As minimum fluoride solubility occurs when the pH reaches about 7 to 9, it would not be advantageous to lower the pH below about 8. Carbon dioxide naturally tends to level out at a pH of about 8.5 and therefore is ideally suited for neutralization of the calcium fluoride slurry. By comparison, the use of an acid such as HCl in the neutralization step may lower the pH below 8, which is undesirable for minimum fluoride solubility.

The neutralized slurry is then filtered, preferably by vacuum filtration, to recover a wet calcium fluoride product. The liquid effluent or filtrate contains a small amount of potassium salt and a trace amount of fluoride. The fluoride level in this effluent must be low enough to satisfy water quality control guidelines which are presently 180 parts per million fluoride maximum in refineery efflueent in California. By practicing the process of the present invention, an effluent fluoride level of about 100 parts per million is achieved.

It has been found that the use of HCl to neutralize the calcium fluoride slurry provides a product which is partially gelatinous and very difficult to filter using standard laboratory filtration procedures. In addition, settling of the particles occurs slowly, which would make a decantation procedure tedious. When carbon dioxide is bubbled into the slurry according to the present invention, the product settles rapidly, filters easily and does not contain halogen impurities, such as chloride, which are undesirable in many commercial applications.

The calcium fluoride product obtained by the present process does contain a minor amount of calcium carbonate as well as residual potassium carbonate. The composition thus obtained closely resembles commercial fluorspar. Upon filtration, the wet calcium fluoride can either be dried or sold as a wet cake. In this regard, commercial fluorspar is usually sold as a 10 percent moisture material to minimize dust in transport.

With reference to product purity, calcium fluoride is available commercially in three grades. The lowest purity grade, which contains 70 percent minimum calcium fluoride, is called metallurgical grade or metspar. Its origin is the mineral fluorspar. The higher purity grades, a ceramic grade containing 90–95 percent calcium fluoride and an acid grade containing greater than 98 percent calcium fluoride, are made by further purifying the fluorspar. The calcium fluoride product obtained by the present process has a purity of more than 70 weight percent and therefore meets the metspar grade purity. Higher purity could be obtained by additional purification.

The following examples are provided to illustrate the invention in accordance with the principles of this invention but are not to be construed as limiting the invention in any way except as indicated by the appended claims.

EXAMPLES

Example 1

A potassium fluoride waste solution from a detergent alkylbenzene HF alkylation plant was recovered from a waste product line which had already been neutralized with excess KOH. A 2-liter sample of this waste containing 4.42 weight percent fluoride combined as potassium fluoride was slurried with 198.9 g of commercial Ash Grove "Kemilime" hydrated lime and stirred for 1 hour with a magnetic stirrer. The amount of lime was equal to 100% of the theoretical requirement to react all the fluoride in the waste to calcium fluoride. The slurry was allowed to settle. Within 1 hour 70 volume percent settled, which increased to 77.5 volume percent after 20 hours, leaving 22.5 volume percent of a dense slurry which was separated by decantation. A 51 g aliquot of this slurry was reslurried with 119 g of additional water to give a 10 weight percent solids in waste slurry. Carbon dioxide was bubbled in the slurry for 1½ hours. The pH after this neutralization was 8.3. The solids settled rapidly, filtered easily, were dried and showed 35.4 weight percent fluoride which calculates to 73 weight percent purity calcium fluoride. Residual fluoride in the neutralized aqueous waste-KOH solution was 2377 ppm indicating 88% of the fluoride in the starting waste was converted to calcium fluoride. This fluoride depleted KOH stream can be returned to the plant for reuse in the HF neutralization step. The filtrate from the carbon dioxide neutralized calcium fluoride filtered product contained 181 ppm fluoride.

EXAMPLE 2

An 18536 g portion of the same waste as in Example 1 was mixed with 1794 g of the Kemilime hydrated lime, equivalent to 107% of the theoretical requirement, to convert the potassium fluoride to potassium hydroxide and calcium fluoride. The mixture was stirred for 1 hour and allowed to settle for 18 additional hours. The supernatant (15124 g) was separated by decantation, leaving 5169 g of a dense mud. The supernatant contained a residual of 2567 ppm fluoride indicating 94.3% of the fluoride was converted to the insoluble calcium fluoride precipitate. A 3300 g aliquot of the mud was mixed with 10,185 g of water to give a 10 weight percent slurry of solids in water and carbon dioxide was bubbled through the slurry for 155 minutes. After settling overnight, the pH of the slurry was 8.85. The fluoride concentration of a sample of clear liquid after filtration was 147 ppm. A small aliquot of the slurry was further treated with carbon dioxide to a pH of 7.35.

Fluoride concentration of the filtrate from this latter sample was 50 ppm, while a sample of the slurry which had been neutralized with carbon dioxide to a pH of 9.0 had a 230 ppm fluoride concentration, showing the value of neutralizing to a pH of about 8. Samples of the neutralized slurry were evaluated for filterability using laboratory size filter leaves and AMETEK company filter cloth. Filterability was excellent, giving rates of 15–22 gal/ft$^2$-hr of filtrate recovered and 9–16 lb/ft$^2$-hr of dry cake. Commercial flocculants had no effect on filterability or flocculation rate.

EXAMPLE 3

The calcium fluoride preparative process was scaled up by using 78691 g of an HF alkylation plant waste stream containing 4.47 weight percent fluoride and a residual KOH content of 0.91 weight percent. Kemi-lime hydrated lime, 6999 g or 99.5% of the theoretical requirement, was added as in Example 1, and stirred 1 hour at ambient temperature. The agitation was stopped and the mixture allowed to settle. In three hours, 65 volume percent of the solids had settled, leaving a clear supernatant, and 78 volume percent had settled in about 6 hours. The slurry was settled for about 16–24 hours, yielding a clear supernatant containing 3764 ppm fluoride and 12.9 weight percent KOH which had formed from the KF. Fluoride conversion was 91.6%.

A total of 64035 g of supernatant was decanted for return to the process, if required, and 21655 g of the precipitated mud was reslurried with 64000 g of fresh water. Carbon dioxide was bubbled through the slurry until the pH reached about 8.6. The slurry was then filtered continuously using a 3-square foot Oliver rotary vacuum filter at conditions approximating commercial operation, 18–20 inches Hg vacuum with a 1.5-minute form time. Filtrate rate was 15 gal/ft$^2$-hr and filter cake rate (dry basis) was about 8 lb/ft$^2$-hr. No flocculants were needed to improve filtration, which was excellent. Filtrates contained about 130 ppm fluoride, well below a California State Department of Health Services guideline of 180 ppm in refinery effluent. The filtered product analyzed on a dry basis to 77 weight percent purity calcium fluoride, 9 weight percent calcium carbonate, 3.5 weight percent potassium (as a mixed salt with calcium carbonate), about 6 weight percent volatiles and about 1 weight percent magnesium and silicon dioxide.

EXAMPLE 4 (COMPARATIVE EXAMPLE)

(a) A 1125 g sample of HF waste as in Example 1 was reacted with 109.4 g of Kemilime hydrated lime or 110% of theory. The mixture was stirred and settled as in the previous examples. The supernatant was removed and analyzed to show 1980 ppm fluoride, indicating 94.2% of the fluoride was converted to the insoluble calcium fluoride precipitate. A 47.4 g portion of the settled mud was mixed with 116 g of water to give a 10 weight percent slurry. HCl was added to neutralize the residual KOH. The pH was reduced from 13.2 to 7.5 with 8.88 ml of concentrated HCl. The slurry at the time was gelatinous and could not be filtered. A Betz cationic flocculant, No. 1160, was added at this point to attempt to improve filtration. No improvement was noted.

(b) The procedure was repeated with 21.9 g of the calcium fluoride slurry with the exception that the Betz 1160 flocculant was added prior to neutralization with HCl. While the resulting solids were not as gelatinous as in Example 4(a), filterability remained poor.

EXAMPLE 5 (COMPARATIVE EXAMPLE)

(a) The procedure of Example 4 was repeated with the exception of using 100% of the theoretical amount of Kemiline hydrated lime for the neutralization. Fluoride conversion was 88.1%. The settled slurry was separated into small fractions of 18–67 g and evaluated for filterability with different commercial flocculants before or after neutralization with HCl. The results are shown in Table 1.

TABLE 1

| Flocculant | pH after HCl neutralization | Type of Solid | Filterability |
| --- | --- | --- | --- |
| None | 8.5 | gel | poor |
| None | 8.0 | gel | poor |
| None | 7.5 | gel | poor |
| SANYO N-OP | 8.7 | fine precipitate | good at start then plugged paper |
| BETZ 1195 | 8.1 | gel | poor |
| BETZ 1125L | 8.1 | gel | poor |
| NALCO 7763 | 8.1 | gel | poor |
| NALCO 7181 | 8.1 | fine precipitate | — |

(b) A 50 g fraction from Example 5(a) was neutralized with carbon dioxide to a pH of 8.3. Filterability was good without flocculants.

What is claimed is:

1. A process for the preparation of high purity calcium fluoride from industrial waste waters containing fluoride which comprises:
   (a) contacting the industrial waste waters containing fluoride with aqueous potassium hydroxide to thereby obtain an aqueous solution of potassium fluoride and potassium hydroxide;
   (b) contacting the solution of step (a) with finely divided high purity lime to thereby obtain a calcium fluoride precipitate in aqueous potassium hydroxide;
   (c) settling the reaction product of step (b) into two phases comprising an aqueous potassium hydroxide supernatant and an aqueous slurry of calcium fluoride;
   (d) recovering the aqueous potassium hydroxide supernatant;
   (e) diluting the slurry of calcium fluoride with water;
   (f) neutralizing the slurry of step (e) with carbon dioxide until the pH of the slurry is lowered to about 8 to 9; and
   (g) filtering the slurry of step (f) to thereby provide the calcium fluoride product.

2. The process according to claim 1, wherein the amount of lime used is in the range of about 1.0 to about 1.2 times the stoichiometric requirement.

3. The process according to claim 1, wherein the aqueous potassium hydroxide recovered in step (d) is recycled to step (a).

4. The process according to claim 1, wherein the filtration step (g) is carried out under vacuum.

5. The process according to claim 1, wherein the purity of the calcium fluoride product is greater than 70 weight percent.

6. The process according to claim 1, wherein the industrial waste waters are obtained from a refinery alkylation process.

7. The process according to claim 1, wherein the lime purity is greater than about 95 weight percent calcium hydroxide.

* * * * *